United States Patent [19]

Bost

[11] 3,953,125
[45] Apr. 27, 1976

[54] CONTACT COPYING APPARATUS FOR REPRODUCING X-RAY FILMS AND THE LIKE

[76] Inventor: Warren J. Bost, 1901 S. Main St., Belle Glade, Fla. 33430

[22] Filed: Aug. 26, 1974

[21] Appl. No.: 500,543

[52] U.S. Cl. .................................. 355/83; 355/84; 355/101
[51] Int. Cl.² ........................................ G03B 27/78
[58] Field of Search ................... 355/83, 81, 84, 99, 355/101, 103

[56] References Cited
UNITED STATES PATENTS

| | | | |
|---|---|---|---|
| 2,019,748 | 11/1935 | Tuttle | 355/83 |
| 2,243,048 | 5/1941 | Foster et al. | 355/83 |
| 3,588,247 | 6/1971 | Noda | 355/83 X |
| 3,605,048 | 9/1971 | Sargent | 355/83 |
| 3,722,980 | 3/1973 | Craig | 355/83 |

*Primary Examiner*—Richard A. Wintercorn
*Attorney, Agent, or Firm*—Duckworth, Hobby & Allen

[57] ABSTRACT

A contact copying device includes first and second plates which are spaced from and substantially parallel with each other, one of the plates having a slot therein. A pair of pickup rollers are provided for feeding superposed films, one of which is unexposed and sensitized, and the other of which includes information thereon which is to be exposed onto the unexposed film. The feed rate of the films past the slot is controlled and varied in accordance with the amount of light required to expose the sensitized film by a source of electromagnetic energy spaced from the slot.

20 Claims, 4 Drawing Figures

CONTACT COPYING APPARATUS FOR REPRODUCING X-RAY FILMS AND THE LIKE

BACKGROUND OF THE INVENTION

1. Field of the Invention

The present invention relates to reproducing apparatus, and in particular relates to contact copying machines of the type which are designed to reproduce X-ray films and the like.

2. Description of the Prior Art

Various prior art copying concepts are known, including those utilizing electrostatic and wet chemical processes. Another technique, referred to as "contact copying," employs an unexposed, sensitized film superposed with an exposed film which bears the information to be recorded on the unexposed film. Some form of electromagnetic energy, such as light, is then provided to expose the sensitized film corresponding to the information carried by the previously exposed film. An example of a contact printing device is disclosed in U.S. Pat. No. 2,572,930 to Heldens. Other prior art copying techniques are disclosed in the following U.S. Pat. Nos. 3,752,579 to Keller et al.; 3,604,801 to Young; 3,140,645 to Block et al.; and 2,038,430 to Jameson.

In the prior art, attempts to reproduce X-ray film using contact copying techniques has previously been subject to streaking and a milky, washed-out or faded appearance.

SUMMARY OF THE INVENTION

The present invention contemplates contact copying apparatus comprising first and second plates spaced from and substantially parallel with each other, one of the plates having a slot therein. Means are provided for feeding through the plates and past the slot a first film of an unexposed, sensitized medium and a second, exposed film of the medium superposed with the first film. Means are also provided for controlling the rate of feed of the film between the plates. A source of electromagnetic energy is spaced from the slot, such that movement of the two films past the slot allows the unexposed film to be exposed and thereby register the information recorded on the previously exposed film.

In accordance with another aspect of the present invention, means are provided for attenuating the amount of electromagnetic energy emitted from the source, and other means are provided for changing the dimension of the slot in the direction of feed, both of these means having as their object the provision for further controlling the amount of electromagnetic energy passing through the previously exposed film and exposing the sensitized film.

In another specific arrangement, the contact copier of the present invention is provided with a speedometer or similar means to determine the feed rate, to thereby allow the operator an indication of the rate of feed.

THE DRAWING

FIG. 1a is a magnified side view of a portion of the apparatus of FIG. 1, taken through the lines 1a–1a'.

DETAILED DESCRIPTION

A preferred embodiment of a contact copying apparatus in accordance with the present invention will now be described with reference to the drawings.

Figure 1:
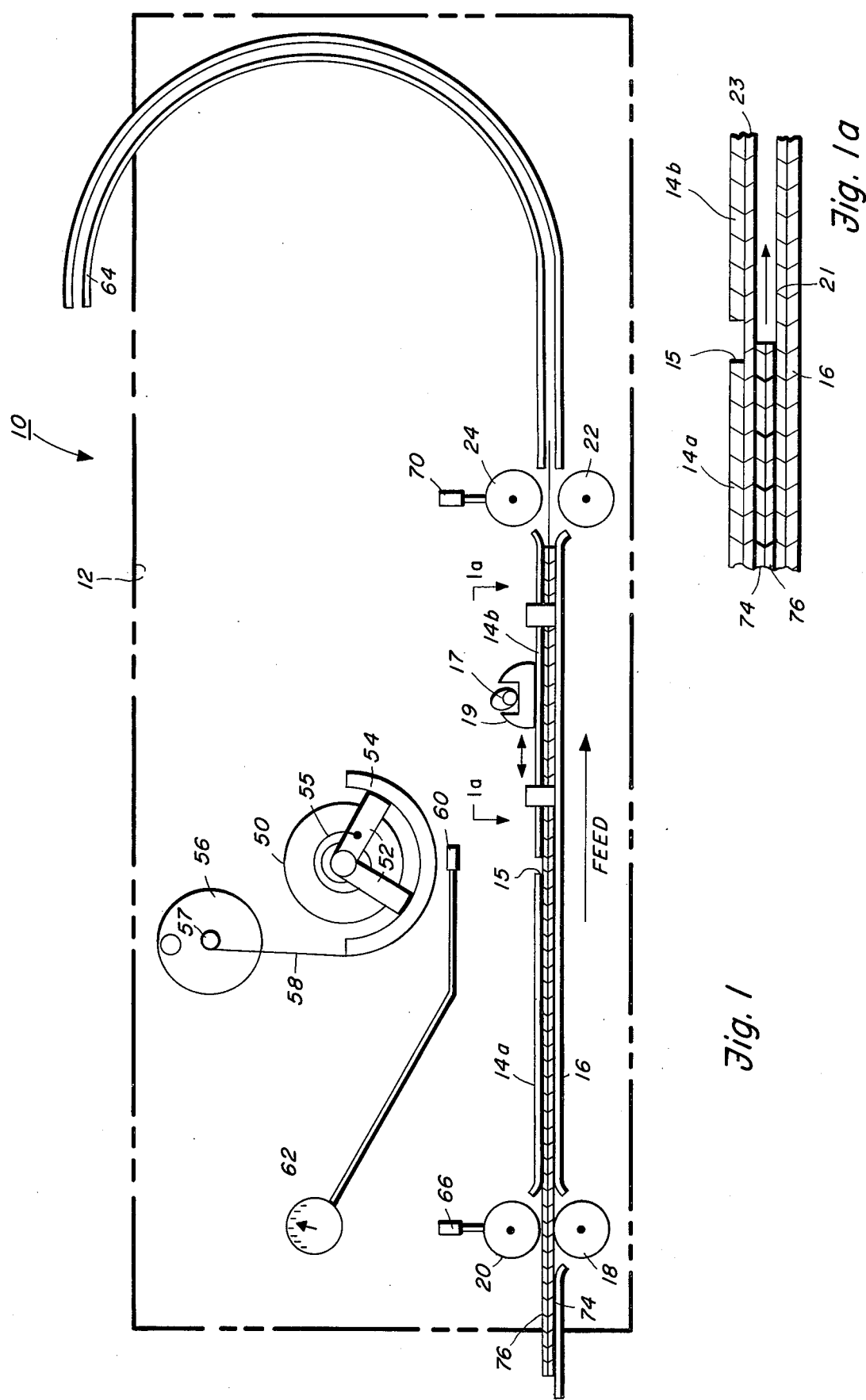
FIG. 1 is a side view, a portion of which is shown by dotted lines, of a portion of contact copying apparatus in accordance with the present invention.

Reference is first made to FIGS. 1 and 1a. The contact copier, referred to generally as 10, is disposed within a chamber 12 shown by dotted lines. Disposed within the chamber 12 is a first plate 14 formed of two sections 14a and 14b. A slot 15 is defined between the two sections 14a, b. A second plate is disposed within the chamber 12 and is spaced from and is substantially parallel with the first plate 14a, b. An eccentric shaft 17 coupled to dogs 19, mounted on the second section 14b of the first plate in order to facilitate movement of that section toward and away from the first section 14a, to thereby change the width of the slot in the direction of feed (represented by the arrow). With specific reference to FIG. 1a, the upper side of the second plate 16 has a black coating 21 thereon, and a transparent sheet 23 is disposed adjacent the underside of both sections 14a, b of the first plate 14.

A pair of rollers 18, 20 are disposed on opposite sides of one end of the plates 14, 16 and a pair of delivery rollers 22, 24 are disposed on opposite sides of the other end of the plates.

Figure 2:
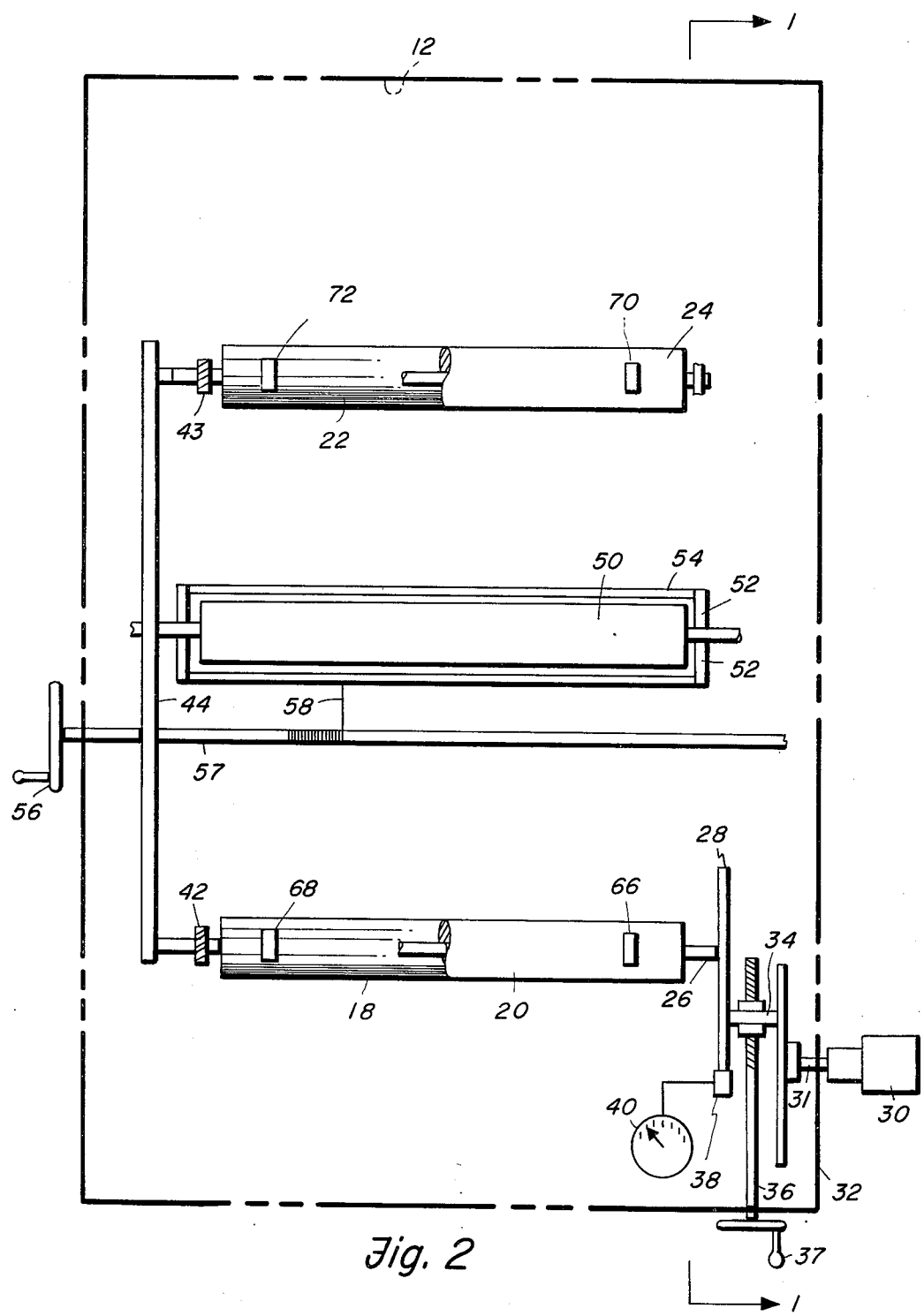
FIG. 2 is a top plan view of a portion of the apparatus shown in FIG. 1, and further including other portions of the apparatus not shown in FIG. 1.

Reference is now made to FIG. 2. One of the pickup rollers 18 includes a shaft 26 on the end of which is mounted a clutch plate 28. A motor 30 is fixed to the side of the chamber 12, and includes a drive shaft 31 on which is mounted a second clutch plate 32. An idler wheel 34 is positioned between the first and second clutch plates 28, 32 and in engagement therewith such that rotation of one of the clutch plates effects rotation of the idler wheel which in turn causes rotation of the other clutch plate. Movement of the idler wheel 34 in a direction radial to both clutch plates 28, 32 is effected by a threaded rod 36 and crank 37. A speed detector 38 is mounted at the periphery of the first clutch plate 28 to measure the rotational speed thereof. A speedometer 40 is mounted externally to the chamber 12 and is coupled to the speed detector 38 to provide a visual indication to the operator of rotational speed of the first clutch plate 28.

The copier 10 also includes means for rotating all of the rollers 18, 20, 22 and 24 when any one of the rollers is rotated. This means includes endless belts 42, 43 and 44 which are respectively coupled to the drive shafts of the corresponding rollers in order to effect this function.

Referring to both FIGS. 1 and 2, a source of electromagnetic energy, which, in this example preferably comprises an ultraviolet fluorescent tube 50, is positioned across the chamber 12 and adjacent to the slot 15. A frame member including struts 52 is provided at opposite ends of the radiation source 50, the struts 52 supporting a variable density filter 54 which comprises a section of a cylinder. A manual winding mechanism 56 is rotatably mounted on a shaft 57 within the chamber 12 and includes a cable 58 coupled to the variable density filter 54, such that rotation of the winder effects movement of the variable density filter 54 into and out of the path between the radiation source 50 and the slot 15. A coiled spring 55 is provided to exert a bias against the struts to return the filter to the "home" position when the winder 56 is rotated in the opposite direction.

A photodetector 60 is positioned in the path of radiation between the variable density filter 54 and the slot 15, and includes a radiation intensity meter 62 coupled therewith and external to the chamber 12 such that the operator can easily ascertain the intensity of radiation being changed by movement of the variable density filter 54 effected by rotation of the winding mechanism 56.

Figure 3:
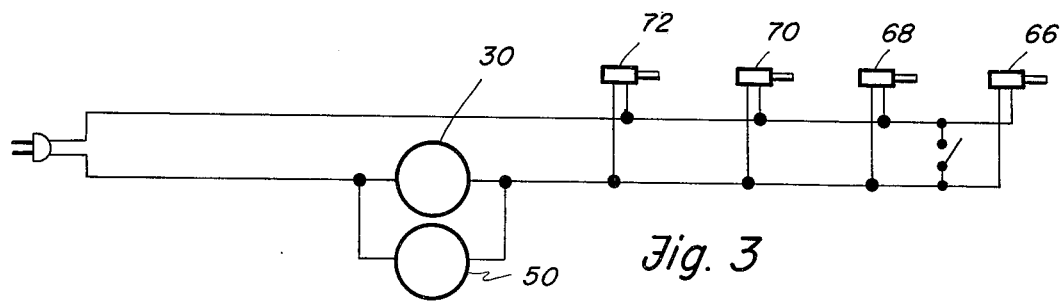
FIG. 3 is a schematic circuit diagram employed with the embodiment shown in FIGS. 1 and 2.

Noting all of FIGS. 1, 2 and 3, two pressure sensitive switches 66 and 68 are provided next adjacent the upper pickup roller 20, and pressure sensitive switches 70, 72 are positioned next adjacent the upper delivery roller 24. Operation of any one of the switches applies alternating current to both the motor 30 and the radiation source 50.

Operation of the copier 10 will now be described. Initially, a first film of an unexposed, sensitized medium, for example an unexposed X-ray film 74, is inserted between the pickup rollers 18, 20 superposed with a previously exposed film 76 which includes the information to be registered on the unexposed film 74. As the two films 74, 76 are passed between the pickup rollers 18, 20, movement of the upper pickup roller in the vertical direction caused by the increased thickness of the films closes one or both of the pressure sensitive switches 66, 68 to operate the motor 30 and energize the electromagnetic source 50. As the two films 74, 76 move past the slot 15, the energy emitted by the source 50 passes through the previously exposed film 76 and causes the information thereon to be registered on the sensitized film 74. The amount of electromagnetic energy falling on any given area of the sensitized film 74 is a function of the feed rate as determined by the position of the idler wheel 34 and the speed of the motor 30, the amount of energy being attenuated by the variable density filter 54 (when positioned between the source and the slot) and the dimension of the slot 15 in the direction of feed. All of these variables and the slot can be controlled in order to optimize the results obtained on the sensitized film 74. The two films 74, 76 are then moved through the delivery rollers 22, 24, where operation of either pressure sensitive switch 70 or 72 continues operation of the radiation source 50 and the motor 30. The two films 74, 76 then are passed out of the chamber 12 via a curved delivery channel 64. During movement between the plates 14 and 16, the black coating 21 prevents flashback, thereby avoiding the obliteration of the image to be copied, and also provides a smooth surface for transporting the lower film 74. The transparent sheet 23 allows energy to pass through the films 74, 76 while preventing binding or jamming of the film 76 in the slot 15.

The contact copier 10 of the present invention has several advantages with respect to the prior art. First, the copier 10 is relatively inexpensive and provides for variable adjustment to several of the parameters which control the amount of energy exposing the sensitized medium. Second, the copier of the present invention has been found to avoid any streaking of the sensitized film and provides a clear, sharp reproduction of the desired image. Third, the copier 10 described above does not require any developing of an electrostatic or chemical layer and therefore avoids difficulties associated with those types of systems.

I claim:

1. Contact copying apparatus comprising:
   a first plate;
   a second plate spaced from, and substantially parallel with said first plate, said second plate having a slot therein;
   means for feeding through said plates and past said slot a first film of an unexposed, sensitized medium and a second, exposed film of said medium superposed with said first film;
   means for controlling the rate of feed of said films between said plates;
   a source of electromagnetic energy spaced from said slot;
   means for varying the amount of electromagnetic energy passing through said slot; and
   means for operating said feed rate controlling means independent of the operation of said electromagnetic energy varying means.

2. The contact copying apparatus recited in claim 1, wherein said electromagnetic energy varying means comprises means for varying the width of said slot.

3. The contact copying apparatus recited in claim 2 wherein said electromagnetic energy varying means further comprises:
   a material capable of attenuating said electromagnetic energy; and
   means for moving said attenuating means into and out of the path between said source and said slot.

4. The contact copying apparatus recited in claim 3, wherein said attentuating material comprises a variable density filter.

5. The contact copying apparatus recited in claim 3 further comprising means for operating said attenuating material moving means independent of the operation of said slot width varying means.

6. The apparatus recited in claim 5 wherein said feeding means comprises:
   a pair of pickup rollers juxtaposed on opposite sides of one end of said plates;
   a pair of delivery rollers juxtaposed on opposite sides of the other end of said plates; and
   means for simultaneously rotating all of said rollers.

7. The apparatus recited in claim 6 wherein said pickup roller pair is spaced from said delivery roller pair a dimension substantially less than the length of said first and second films in the direction of feed between said plates.

8. The apparatus recited in claim 7 further comprising:
   a first switch electrically coupled to said rotating means, said first switch disposed next adjacent one of said rollers of said pickup roller pair such that said first switch closes to energize said rotating means when said first and second films are therebetween;
   a second switch electrically coupled to said rotating means, said second switch disposed next adjacent one of said rollers of said delivery roller pair such that said second switch closes to energize said rotating means when said first and second films are therebetween; and wherein
   said rotating means is energized by either or both of said first and second switches.

9. Contact copying apparatus for reproducing true copies of X-ray films, comprising:
   a chamber;
   a pair of spaced, substantially parallel plates disposed in said chamber, a first one of said plates having a slot therein, said slot having a transverse dimension which is substantially less than the corresponding dimension of said X-ray film;

a pair of pickup rollers in said chamber juxtaposed on opposite sides of one end of said plate;

a pair of delivery rollers in said chamber juxtaposed on opposite sides of the other end of said plates;

means for simultaneously rotating all of said rollers;

means for varying the rotational speed of said rotating means so as to vary the feed through said plates past said slot of a first, unexposed X-ray film and a second, exposed X-ray film superposed with said first film and adjacent said first plate;

a source of light spaced from said slot whereby movement of said first and second films through said plates and past said slot causes light from said source to pass through said second film and reproduce any information thereon onto said first film;

means for varying the width of said slot; and means for operating said slot width varying means independent of said rotational speed varying means.

10. The apparatus recited in claim 9 wherein said width-varying means comprises:
said first plate including two sections with said slot comprising a space therebetween; and
means for moving a first one of said sections toward and away from the other of said sections.

11. The apparatus recited in claim 9 wherein said simultaneous rotating means comprises:
means coupled to said rollers of each roller pair together such that rotation of one effects rotation of the other; and
an endless belt coupled between one roller of said pickup roller pair and one roller of said delivery roller pair.

12. The apparatus recited in claim 9 wherein said rotational speed varying means comprises:
a motor having a drive shaft;
a first clutch plate fixed on said drive shaft;
a shaft extending through one of said pickup rollers;
a second clutch plate fixed to said roller shaft;
an idler wheel positioned between and engaging said first and second clutch plates such that rotation of one clutch plate effects rotation of said idler wheel to thereby rotate the other of said clutch plates; and
means for moving said idler wheel in a radial direction with respect to said first and second clutch plates.

13. The apparatus recited in claim 12 further comprising:
means coupled to said first clutch plate for measuring an indication of the speed thereof; and
means external to said chamber and coupled to said measuring means for providing a visual indication of the measured speed.

14. The apparatus recited in claim 9 further comprising means for varying the intensity of light passing through said slot.

15. The apparatus recited in claim 14 wherein said intensity varying means comprises:
a variable density filter; and
means for moving said filter into and out of the path between said source and said slot.

16. The apparatus recited in claim 15 wherein said moving means comprises:
a frame rotatably supported at opposite ends of said light source, said frame including a cylindrical section with said filter positioned thereacross;
a winding mechanism fixed to one side of said chamber;
a cable coupled between said winding mechanism and said filter; and wherein
rotation of said winding means effects movement of said filter into and out of the path between said source and said slot.

17. The apparatus recited in claim 16 further comprising means positioned between said filter and said slot for measuring the intensity of light from said source.

18. The apparatus recited in claim 17 further comprising means external to said chamber and coupled to said intensity measuring means for providing a visual indication of the intensity of said light.

19. The apparatus recited in claim 9 further comprising a substantially black layer between said second plate and said film.

20. The apparatus recited in claim 19 further comprising a substantially transparent layer between said first plate and said film.

* * * * *